Figure 1:
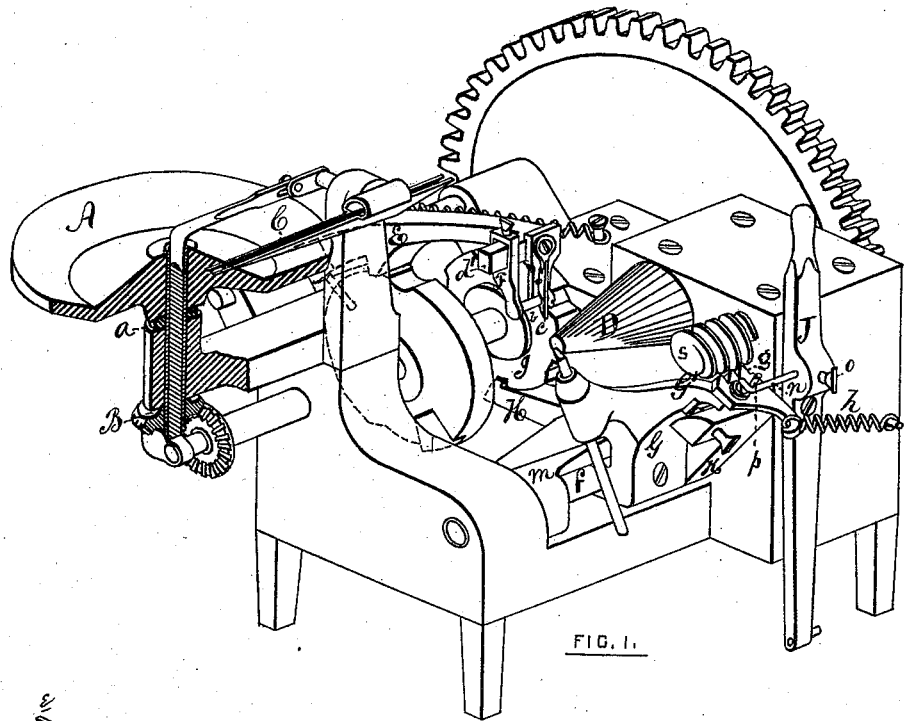

H. K. JONES.
SCREW-CUTTING MACHINE.

No. 177,645. Patented May 23, 1876.

WITNESSES.
Leonard Doig

INVENTOR.
Horace K Jones

UNITED STATES PATENT OFFICE.

HORACE K. JONES, OF BERLIN, ASSIGNOR TO THE RUSSELL AND ERWIN MANUFACTURING COMPANY, OF NEW BRITAIN, CONNECTICUT.

IMPROVEMENT IN SCREW-CUTTING MACHINES.

Specification forming part of Letters Patent No. 177,645, dated May 23, 1876; application filed February 4, 1876.

*To all whom it may concern:*

Be it known that I, HORACE K. JONES, of Berlin, in the county of Hartford and State of Connecticut, have invented certain new and useful Improvements in Machines for Threading Screws; and I do hereby declare that the following specification, taken in connection with the drawings making a part of the same, is a full, clear, and exact description thereof.

The machine hereinafter described belongs to that well-known class of screw-cutting machines which employ a reciprocating chasing-tool, which is under the control of a leading-screw while the successive cuts are being made, and is disconnected from such screw after the completion of each cut to enable the tool to be carried back to the position for beginning the next cut, and then be re-engaged with the screw. Said machine is also furnished with a revolving notched cam for determining the number and depths of the cuts which the chaser is required to make. It has also a revolving spindle-carrying griping-jaws, to which jaws the blanks are supplied, one by one, from a pair of feeding-fingers, which, in turn, are supplied by well-known mechanism for selecting blanks from a mass and delivering them, one at a time, to the feeding-fingers.

The several improvements which compose my invention, and are engrafted on a machine of the general character above mentioned, relate to details of construction and features of combination and arrangement which tend to simplify the organization of the machine, and make it more efficient for the work for which it is designed.

In previous machines of this class the hopper or dish A, into which the screw-blanks are placed in mass, has been made to revolve in a horizontal plane by being firmly attached to the gear-driven shaft B. With a hopper so driven it often happens that the vibratory conveyer C will, upon ploughing into a mass of blanks, meet with some obstruction, when, and as a result from, the positive movement of the hopper, a quantity of blanks will be thrown out upon the floor.

In my machine the hopper A is attached to the vertical driving-shaft B, so as to turn with the shaft only by the frictional contact of the surface of the shaft, and that of the shoulder *a* upon which the hopper rests, with the corresponding bearing-surfaces of the hopper, so that if any considerable obstruction occurs to the revolution of the hopper it will stop. The tilting conveyer C is constantly vibrating, and so soon as its end, which enters the hopper, is raised, the hopper will commence again to revolve and present a new portion of the mass of blanks to be entered by the conveyer upon its next descent into the same. The degree of friction which shall exist between the hopper and its shaft can be regulated at pleasure by means of a set-screw applied through the sleeve of the hopper, and having its end bearing against the shaft; or the pressure of a spring, or any other form of mechanical compress, can be employed which will give an adhesive frictional connection only between the shaft and the hopper.

Another improvement consists in the construction of the spring-fingers, which take the blanks, one by one, from a suitable mechanism such as is commonly used in self-feeding screw-machines.

It is very desirable that the blanks should be held by the fingers, as they are successively presented for insertion into the holding-jaws of the revolving spindle D as nearly as possible in a line which coincides with the axis of the spindle. At the same time the fingers require to be delicate and not clumsy instruments. In order, therefore, to secure a wide extent of bearing for the blank to rest against, I make the back stationary finger or rest *b* bifurcated, the two legs being, by preference, separated a considerable distance apart, so as to give a bearing upon either side of the central section of the blank at two distinct points, and arrange the movable or spring-finger *c* so that it will press upon the blank only at a point intermediate between the bearing-points of the blank against the rear member. By this means the blank is aligned entirely by the bearings of the rear stationary member, and the spring-member *c* acts merely to hold it in position when thus aligned.

Another feature of my invention consists in the employment of a device, in combination with the feeding-fingers, for inserting the blank into the jaws of the spindle against the pressure of a spring within the spindle, of sufficient power, when permitted to act, to expel the screw, when finished, from the jaws.

The arm E, to which the feeding-fingers are attached, is in this, as in other machines for a similar purpose, capable of moving laterally toward the spindle, for the purpose of inserting the blank into the open jaws of the spindle after the fingers have brought the blank into proper alignment with the axis of the jaws. It is desirable, also, to have the blank in entering the jaws compress a spring located within the jaws, and which spring, by its recoil when the jaws open again, will expel the finished screw with force. The fingers do not possess the requisite degree of strength, or have the necessary gripe upon the blank to properly perform this office, and it has been customary to employ an independent punch or follower to press upon the end of the blank and force it into the jaws against the spring.

Figure 3:
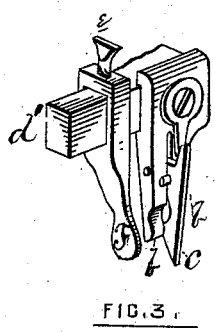

I accomplish the insertion of the blank by means of a downwardly-projecting arm, F, Fig. 3, which is adjustable in its position upon a bar, $d'$, which latter is attached to the finger-arm E. This arm is strong enough to sustain the pressure which it is required to bear, and is set by means of an adjusting clamp-screw, e, to a position upon the bar F, which will suit the length of blank which is being threaded.

It is obvious that when the finger-bar is moved sidewise toward the spindle-jaws, the arm F, bearing against the end of the blank, will furnish the necessary resistance to enable the blank, by the lateral movement of the finger-arm, to be inserted against the pressure of the ejecting-spring within the spindle.

Figure 2:
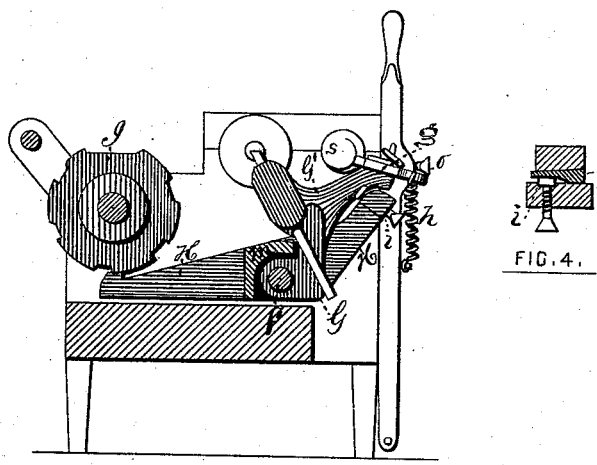
Figure 4:
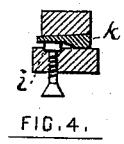

A feature of the arrangement which exists in my machine, and tends to the simplification of its organization is, the location of the rocking and reciprocating tool-post G, Fig. 2, and the lever H, which, with the revolving notched wheel I, controls the number and depth of cuts which the chasing-tool shall make, upon the same fulcrum-shaft $f$. The comb $g$, which, in combination with the leading screw, gives the movement to the chaser in effecting the cuts, is located on the arm G', connected with, and forming a member of, the tool-post, and a spring, $h$, attached at one end to the comb, and at the other end to the frame, performs the office of pulling the comb backward away from engagement with the leading screw s, and laterally to the point for beginning a fresh cut, when the lever H permits it to act.

The arrangement above described enables the single lever H, with its spring $h$, to control all the movements of the tool-post, and especially from the fact that both tool-post and lever are mounted on the same shaft. The shoe, i on the lever, and the former k on the tool-post, will always preserve the same relation to each other during the performance of the successive cuts, whereby all the shavings are taken from the blank in the formation of the screw-thread under the same relation of the chaser to the blank. Moreover, the location of the comb upon the arm G' in extension of the tool-post, enables the single lever H to operate both the comb and the tool-post, and dispense with the complex arrangement heretofore employed.

It will be observed, too, that the shaft $f$, upon which the tool-post slides, is protected against the gumming effect of the stream of potash water, kept constantly running upon the chaser, by an overhanging shield, m, which is attached to the lever H, and forms a lateral extension of it.

Another feature of my invention is the manner in which the mechanism for stopping the machine is combined with the reciprocating tool-post. J, Fig. 1, is the belt-shipper, which is connected with the driving-belt, and with a fast and loose pulley in the usual way. A rod, n, is attached to the shipper-lever, and, by means of a clamp-screw, o, can be adjusted so as to project to a greater or less distance laterally from the lever. The end of this rod is bent at right angles with its length, so as to form a stop against which a stud-pin, p, on the top surface of the comb can, under certain circumstances, bring up.

If, from any cause, the spring $h$ fails to draw back the tool-post as far as it ought, whereby the comb will engage with the leading screw too near its end, then the tool-post will be carried along by the revolution of the screw farther than it ought to be, and the pin p will come into contact with the bent end of the rod n, whereupon the shipper J will be vibrated in the proper direction for shifting the driving-belt from the fast to the loose pulley, and the machine will be stopped.

What I claim as my invention, and desire to secure by Letters Patent, is—

1. The combination, with a hopper or revolving dish for containing screw-blanks in mass, with a tilting separator and conveyer of the blanks, when such hopper is attached to its driving-shaft by an adhesive frictional bearing, substantially as described.

2. The combination, substantially as described, of the stationary bifurcated finger, constituting separate points of bearing for correctly aligning the screw-blank, with a spring-holder applied to the opposite side of the blank, intermediate between the two branches of the bifurcated stationary finger, substantially as specified.

3. The combination, with the vertically and laterally moving fingers, of the adjustable arm F and the holding-jaws, the several parts co-operating, substantially as described, for presenting a blank to the jaws and forcing it therein, as set forth.

4. The lever H, having a shoe, i, in combination with a leading screw, and with a rocking and laterally reciprocating post, carrying a cutting-tool and a comb, and arranged to slide on the face of the lever-shoe, substantially as described.

5. The combination, substantially as described, of the belt-shipper lever with the reciprocating tool-post, whereby, in case the tool-post overruns its proper extent of lateral movement, the machine will be stopped, as set forth.

6. A rocking-post mounted on a fulcrum-shaft, and provided with a tool-arm and a comb-arm, substantially as described.

HORACE K. JONES.

Witnesses:
LEONARD DOIG,
HENRY E. RUSSELL, 2d.